United States Patent
Beim et al.

[11] Patent Number: 5,961,414
[45] Date of Patent: Oct. 5, 1999

[54] DUAL MODE CONTINUOUSLY VARIABLE TRANSMISSION HAVING MULTIPLE TORQUE INPUT PATHS

[75] Inventors: Rudolf Beim, Bloomfield Hills; Daniel Warren McCarrick, Canton; Barry John Melhorn, Ann Arbor, all of Mich.

[73] Assignee: Ford Global Technologies, Inc., Dearborn, Mich.

[21] Appl. No.: 08/939,640

[22] Filed: Sep. 29, 1997

[51] Int. Cl.$^6$ .................................................. F16H 37/02
[52] U.S. Cl. ........................ 475/212; 475/207; 475/218; 475/219
[58] Field of Search .................................. 475/207, 210, 475/211, 212, 213, 214, 215, 218, 219

[56] References Cited

U.S. PATENT DOCUMENTS

| | | | |
|---|---|---|---|
| 3,203,277 | 8/1965 | General | 475/211 |
| 4,344,336 | 8/1982 | Carriere | 475/217 X |
| 4,402,237 | 9/1983 | Tomlinson | 475/211 X |
| 4,458,559 | 7/1984 | Croswhite et al. | |
| 4,539,866 | 9/1985 | Koivunen | 475/210 |
| 4,553,450 | 11/1985 | Gizard | 475/212 |
| 4,608,032 | 8/1986 | Stockton et al. | |
| 4,644,820 | 2/1987 | Macey et al. | 475/211 |
| 4,836,049 | 6/1989 | Moan | |
| 4,856,369 | 8/1989 | Stockton | 475/211 |
| 4,876,920 | 10/1989 | Eichenberger | |
| 4,990,127 | 2/1991 | Roberts et al. | 475/211 |
| 5,167,591 | 12/1992 | Cowan | 475/211 |
| 5,267,913 | 12/1993 | Beim et al. | 475/218 |
| 5,323,871 | 6/1994 | Wilson et al. | 180/197 |
| 5,803,858 | 9/1998 | Haka | 475/207 X |
| 5,803,859 | 9/1998 | Haka | 475/210 X |
| 5,827,146 | 10/1998 | Yan et al. | 475/210 |
| 5,833,571 | 11/1998 | Tsukamoto et al. | 475/211 X |
| 5,846,151 | 12/1998 | Taniguchi et al. | 475/210 |
| 5,888,161 | 3/1999 | McCarrick et al. | 475/207 X |

FOREIGN PATENT DOCUMENTS

| | | | |
|---|---|---|---|
| 35 43 635 A1 | 6/1986 | Germany | 475/211 |
| 2-180-020 | 3/1987 | United Kingdom | |

OTHER PUBLICATIONS

The Ford Research Dual Mode Continuously Variable Transmission, T.R. Stockton, International Conference on Fuel Efficient Power Trains and Vehicles, London, England, Oct. 1984 (841305).

*Primary Examiner*—Charles Marmor
*Assistant Examiner*—Scott Lund
*Attorney, Agent, or Firm*—Frank G. McKenzie

[57] ABSTRACT

An automatic transmission for an automotive vehicle includes a continually variable drive mechanism having one sheave assembly fixed to an input shaft and the output sheave assembly supported on an intermediate shaft, a first gearset for producing forward drive low gear and a range of continuously variable gear ratios, a second gearset for producing reverse drive, a first fixed ratio drive mechanism in the form of a chain drive providing a torque delivery path between the intermediate shaft and a ring gear of the first gearset, a second fixed drive mechanism in the form of a chain drive located in a torque delivery path between the output shaft and a front drive shaft, a transfer clutch for connecting and releasing the output sheave of the variable drive mechanism and sprocket wheel fixed to that shaft, a coast brake and forward brake for holding alternately the ring gear of the first gearset, and a reverse brake for holding the carrier of the second gearset.

11 Claims, 3 Drawing Sheets

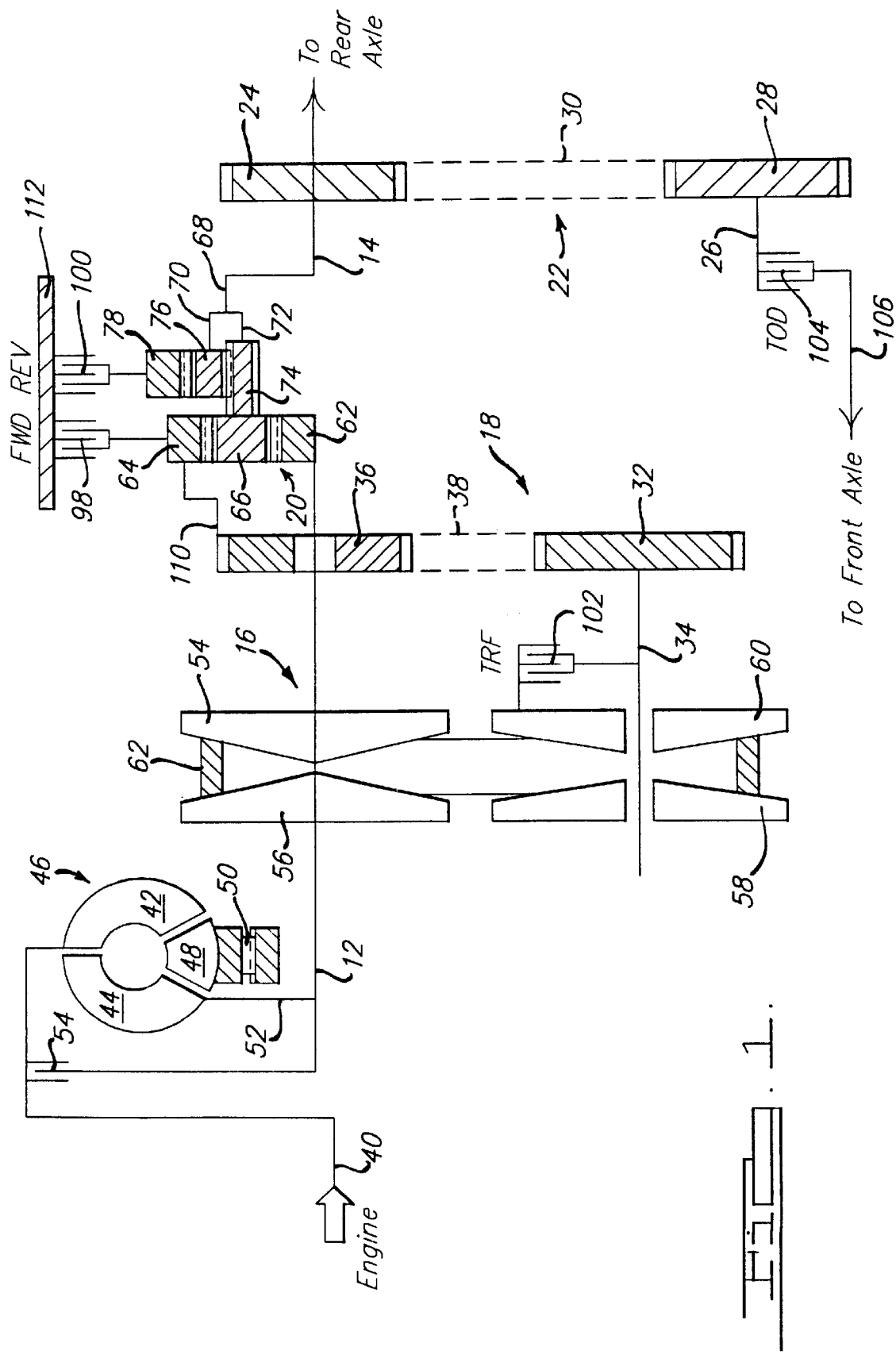

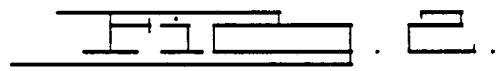
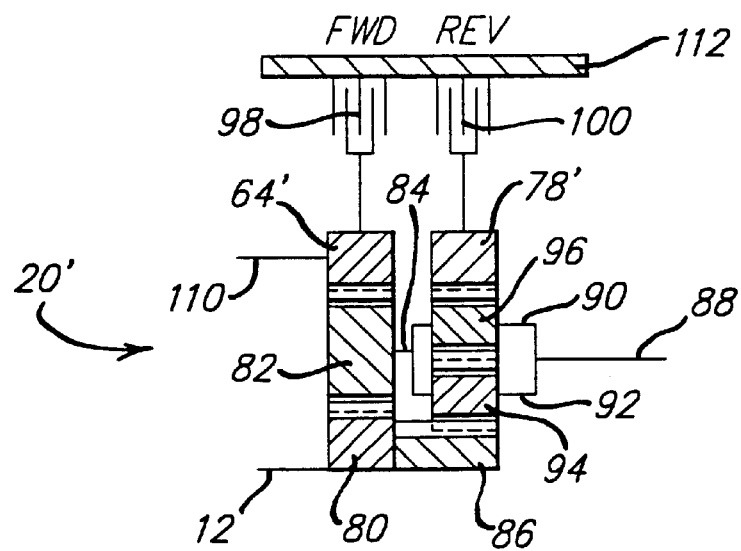
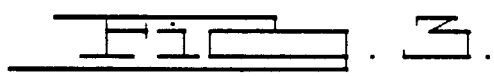

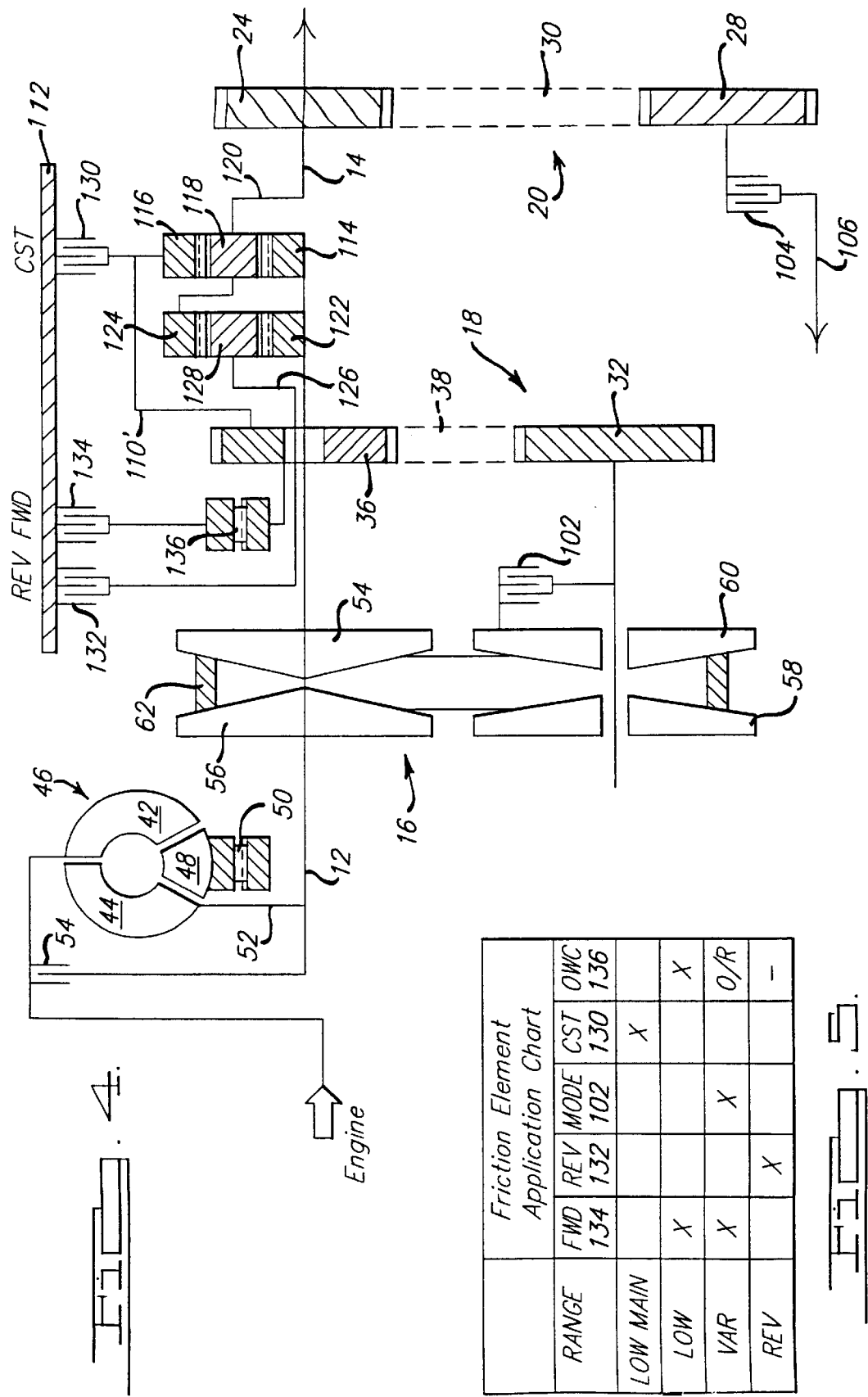

5,961,414

DUAL MODE CONTINUOUSLY VARIABLE TRANSMISSION HAVING MULTIPLE TORQUE INPUT PATHS

BACKGROUND OF THE INVENTION

1. Field of the Invention

This invention relates to automatic transmissions for automotive vehicles. More particularly it pertains to such transmissions having a fixed ratio drive mechanism and a variable ratio drive mechanism.

2. Description of the Prior Art

A conventional multiple speed transmission has a number of spaced speed ratio changes produced by selectively holding and releasing components of a planetary gear set. An infinitely variable transmission that employs two variable diameter pulleys, and a drive belt engaging the pulleys provides a continuously variable speed ratio over a broad range of engine speeds.

A bladed hydrokinetic torque converter located in the drive path between an engine and the planetary gearing provides additional torque multiplication for accelerating a motor vehicle from rest. A stall torque ratio of about 2.5:1 may be realized using a torque converter.

A continuously variable transmission combining a fixed drive unit, variable drive unit, and torque converter is described in UK Patent application GB-2180020, assigned to the assignee of the present invention. After the torque converter reaches its coupling phase, when the ratio of the hydrokinetic unit is 1:1, the drive ratio for the powertrain is reduced to 8:1 from approximately 20:1 when the fixed drive ratio is 2:1 and the final drive and axle system ratio is 4:1. At that time the variable ratio drive is activated. Upon further acceleration of the vehicle, the overall transmission ratio may be controlled from 8:1 down to 2:1.

U.S. Pat. Nos. 4,856,369, 4,836,049 and 3,203,277 describe continually variable transmissions that employ a variable drive mechanism and a fixed drive mechanism in combination with a torque converter and planetary gearing.

SUMMARY OF THE INVENTION

It is an object of this invention to provide a transmission able to accelerate a motor vehicle from rest through a speed reduction drive that bypasses a belt driven variable ratio drive mechanism so that the relatively large starting torque is carried by robust mechanical components and not by torque limited components, such as a drive belt.

It is another object of this invention that the transmission produce a continuously variable speed ratio over a range from the first gear (starting gear) ratio to the highest ratio, an overdrive ratio.

Another object is to operate in the continuously variable ratio range by driving two components of the planetary gear unit, one component driven directly by the engine, a second component driven at a reduced speed by a fixed ratio drive mechanism.

According to the invention there is provided a continuously variable transmission for an automotive vehicle comprising an input shaft, an output shaft, a variable ratio drive having an input driveably connected to the input shaft and having an output for producing a continuously variable ratio of the input shaft speed to the output speed, a fixed ratio drive having an output and an input driveably connected to the output of the continuously variable ratio drive, a transfer clutch for alternately driveably connecting and disconnecting the output of the variable ratio drive and input of the fixed ratio drive, a first gearset having first and second elements, located in a torque delivery path between the input and output shafts, for driving the output shaft at low forward speed ratio, and for driving the output shaft at a continuously variable forward speed ratio when said first element is driven by the input shaft and said second element is element is driven by the output of the fixed ratio drive, a low brake for alternately releasing and holding the second element of the first planetary gearset against rotation, a second gearset having first and second elements located in a torque delivery path between the input and output shafts for driving the output shaft at a reverse speed ratio, and a reverse brake for alternately releasing and holding the second element of the second gearset against rotation.

BRIEF DESCRIPTION OF THE DRAWINGS

FIG. 1 is a schematic diagram of the kinematic arrangement for an automatic transmission according to the present invention.

FIG. 2 is a chart showing the engaged and disengaged state of clutches and brakes of the transmission of FIG. 1.

FIG. 3 is an alternate arrangement of the gearset of the transmission of FIG. 1.

FIG. 4 is a schematic diagram of the kinematic arrangement for an automatic transmission according to the present invention.

FIG. 5 is a chart showing the engaged, disengaged, driving and overrunning state of the clutches and brakes of the transmission of FIG. 4.

DESCRIPTION OF THE PREFERRED EMBODIMENT

Referring first to FIG. 1, a continuously variable transmission according to this invention includes an input shaft 12, output shaft 14, variable ratio drive mechanism 16, fixed ratio drive mechanism 18, and planetary gearset 20, which is driveably connected to the output shaft. FIG. 1 shows a second fixed ratio drive mechanism 22 driveably connecting output shaft 14, which rotatably supports an input sprocket wheel 24, and an intermediate shaft 26, which supports a driven output sprocket 28, sprockets 24, 28 being mutually driveably engaged with a chain 30. Alternatively, shaft 26 can be driveably connected to shaft 14 through another fixed ratio gear mechanism, such as a simple layshaft arrangement including gears in place of sprockets 24, 28 and a pinion meshing with those gears so that shaft 26 turns in the same direction as shaft 14.

Chain drive mechanism 18 is a similar arrangement to that of drive mechanism 22, in which an input sprocket wheel 32 is fixed to and rotatably supported on intermediate shaft 34, an output sprocket 36 is supported rotatably on input shaft 12, but is free to rotate independently of shaft 12. Chain 38 is mutually driveably engaged with sheave 36 and sheave 32. Alternatively, drive mechanism 18 may include gears in place of sprocket wheels 32, 36 and a pinion meshing with those gears so that gear 36 turns in the same direction as shaft 34.

The engine crankshaft 40 is driveably connected to a hydrokinetic torque converter 46 that includes a bladed impeller wheel 42 arranged in a toroidal flow path with bladed turbine wheel 44, arranged to be driven hydrodynamically by fluid exiting the impeller wheel. A bladed stator wheel 48 is located in the flow path between fluid entrance to the impeller and the fluid exit of the turbine. A one-way clutch 50 rotatably supports the stator wheel in one direction about the axis of shaft 12. In a conventional way the torus of the torque converter is filled with hydraulic fluid and the turbine wheel 44, is supported rotatably on a turbine hub 52, which is connected driveably to input shaft 12. A hydraulically operated bypass clutch 54 alternately mechanically connects engine shaft 40 to the input shaft 12 when clutch 54 is engaged, and allows shaft 40 to drive the impeller hydraulically when clutch 54 is disengaged. The torque converter produces torque amplification and speed reduction until it reaches coupling speed.

Variable ratio drive mechanism 16 includes a first sheave assembly, which includes pulleys 54, 56 supported rotatably on input shaft 12, a second sheave assembly including pulleys 58, 60, supported rotatably on intermediate shaft 34. One of the first pair of pulleys is fixed in its axial position on the input shaft, the other pulley of the pair is moveable axially along the shaft, preferably due to the effect of hydraulic pressure applied to an actuating device, so that the radial position of the drive belt 62 moves in accordance with the axial position of the axially displaceable pulley due to the inclined surfaces of the pulley faces that engage driveably the lateral surfaces of the drive belt 62. Similarly, one of the pulleys 58, 60 on shaft 34 is fixed in its axial position, and the other pulley is axially displaceable so that the inclined inner faces of the pulleys are continually engaged at a variable radial position with lateral surfaces of drive pulley 62. Movement of the displaceable pulleys is mutually coordinated so that they maintain driving contact with the belt.

The planetary gearset 20 includes a sun gear 62 driveably connected continually with input shaft 12; a first ring gear 64, surrounding sun gear 62; a set of planet pinions 66, driveably engaged continually with the sun gear and ring gear 64; a carrier 68, supporting a first shaft 70 and a second shaft 72; a second set of planet pinions 74, each member of the set fixed to the corresponding member of the planet pinion set 66 and rotatably supported on carrier shaft 72; a third set of planet pinions 76, each member of the set in continuous meshing engagement with a member of pinion set 74 and rotatably supported on carrier shaft 70; and a ring gear 78 continuously meshing with pinion set 76. Carrier 68 is continually driveably connected to output shaft 14. Ring gear 64 is driveably connected by member 110 to the output of fixed ratio drive, for example, to sprocket wheel 36.

FIG. 3 shows an alternate embodiment of a gearset 20' that can be used in the present invention. The gearset includes a sun gear 80 driveably fixed to input shaft 12; a ring gear 64', surrounding sun gear 80; a set of planet pinions 82, continually driveably engaged with sun gear 80 and ring gear 64' and rotatably supported on a carrier shaft 84; a second sun gear 86 driveably fixed to sun gear 80; a ring gear 78' surrounding sun gear 86; a carrier 88 having pinion shafts 84, 90 and 92; a set of planet pinions 94, continually driveably engaged with sun gear 86 and rotatably supported on pinion shaft 92; a set of planet pinions 96 continually driveably engaged with ring gear 78', rotatably supported on carrier shaft 90, and each member of the pinion set 96 continually driveably engaged with the member of pinion set 94. Ring gear 64' is driveably connected by member 110 to the output of fixed ratio drive, for example to sprocket wheel 36.

The elements of the system according to this invention are controlled operatively by various clutches and brakes, preferably hydraulically actuated friction devices including forward brake 98, reverse brake 100, transfer clutch 102, and torque on demand (TOD) clutch 104. The brakes 98 and 100 and clutches 102, 104, may be hydraulically operated, mechanically operated or electrically operated. Furthermore, the reverse brake 100 may be a friction brake or a hydraulically operated brake band controlled by a hydraulic servo.

Input shaft 12 is connected, preferably through a torque converter 46, to a source of power, such as an internal combustion engine or electric motor. Output shaft 14 is driveably connected to the drive wheels of a motor vehicle, preferably the rear axle, and sprocket 28 is connectable through clutch 104 to the drive wheels of a motor vehicle, preferably the front axles. Alternatively, output shaft 14 can be connected to the front axles, and shaft 106 is connected to rear axles. Another alternative is to connect output shaft 14 to the drive wheels of a motor vehicle solely through the second fixed drive means that includes sprockets 24, 28 and chain 30, rather than connecting output shaft 14 directly to the drive wheels.

With the input shaft 12 driven by the power source, forward brake 98 engaged, reverse brake 100 disengaged, and the transfer clutch 102 disengaged, the motor vehicle is accelerated forward from rest in a first or low gear ratio. Ring gear 64 is held against rotation on the transmission case due to engagement of brake 98, and the sun gear 62 is driven in the same direction as that of the power source. Grounding ring gear 64 causes carrier 68 to be underdriven in the same rotary direction as that of input shaft 12. Carrier 68 drives output shaft 14. The carrier is also driveably connected to sprocket 24, which drives sprocket 28 through chain 30. Sprocket 28 can be connected to the front axles selectively by engaging clutch 104 to produce all wheel drive or four wheel drive.

A ratio change to the continually variable ratio mode of operation is accomplished by disengaging brake 98 and engaging transfer clutch 102. The input shaft is permanently driveably connected to the sheave and pulley assembly 54, 56 of the variable drive mechanism 16, which drives sheaves 58, 60 at a variable speed that depends on the relative radial position of the drive belt engaged with the sheaves. Clutch 102 driveably connects the output sheaves 58, 60 to shaft 34, on which sprocket 32 is fixed and rotatably supported. Sprocket 32 is driveably engaged with the chain belt 38, which also engages sprocket wheel 36, continuously driveably engaged through member 110 to ring gear 64. This action provides two torque input paths to the gearset: the first includes input shaft 12 and sun gear 62; the second includes input shaft 12, variable ratio drive mechanism 16, the first fixed ratio drive mechanism 18, member 110, and sun gear 64. Because of this dual torque path, the belt 62 of the variable ratio drive mechanism 16 has applied to it only a portion of the total torque carried by input shaft 12. The carrier 68 is driven at a speed ratio determined by the gear unit 20 and the speed ratio produced by the variable ratio drive mechanism 16. Carrier 68 and output shaft 14 are driven at a speed ratio that varies from an underdrive ratio, the speed of the low gear, to an overdrive ratio in relation to the speed of shaft 12.

Reverse drive is produced by engaging reverse brake 100, and disengaging forward brake 98 and transfer clutch 102. This action holds ring gear 78 fixed against rotation on the transmission housing. The input to the gearset during reverse drive operation, is through sun gear 62. Grounding ring gear 78 causes carrier 68 and shaft 14 to be underdriven in the opposite direction from that of input shaft 12.

Preferably the speed ratio produced in first or low gear is spaced slightly from the speed ratio at the lowest end of the continually variable range, produced through operation of the variable ratio drive 16, first fixed ratio drive 18 and gear unit 20. In this way the transition from first gear to the lowest variable gear is an upshift.

In FIG. 4 many of the components of the transmission of this invention are the same and interconnected the same as those of FIG. 1 except in the region of the planetary gearset. Here the position of the first and second gearset is reversed and both gearsets are simple planetary sets. The first gear unit includes a sun gear 114 driveably connected directly to input shaft 12, a ring gear 116 surrounding the sun gear and directly connected driveably by member 110' to the output sprocket 36 of the fixed drive mechanism 18, and a first set of planet pinions 118 supported rotatably on a carrier 120 in continuous meshing engagement with sun gear 114 and ring gear 116. Carrier 120 and output shaft 14 are driveably connected.

The second gear unit includes sun gear 122 driveably connected to input shaft 12 and sun gear 114, ring gear 124, carrier 126 and a second planet pinion set 128, supported rotatably on carrier 126 in continuous meshing engagement with sun gear 122 and ring gear 124.

A coast brake 130 alternately releases gear 116 and holds ring gear 116 and sprocket wheel 36 against rotation on the transmission housing 112 when that brake is engaged. A reverse brake 132 alternately releases carrier 126 and holds carrier 126 against rotation on the transmission casing when that brake is engaged.

Arranged in parallel between the transmission housing and sprocket wheel 36 with member 110' and brake 130 are a forward brake 134, which alternately releases ring gear 116 and sprocket 36 when the brake is disengaged and holds those components against rotation on the transmission housing when that brake is engaged. A one-way clutch 136, arranged in series with forward brake 134, produces a one-way drive connection between sprocket wheel 36 and housing 112.

The vehicle operator can select the first gear ratio operation manually by moving a range selector to a corresponding position. This action causes engagement of coast brake 130, disengagement of the other friction elements, and allows clutch 136 to overrun. With the transmission controlled in this way, sun gear 114 is driven directly by the engine through the torque converter, ring gear 116 is held against rotation, and carrier 120 and output shaft 14 are underdriven in relation to the speed of shaft 12.

When the range selector is placed in the drive position, the first gear ratio is produced automatically by engaging forward brake 134, disengaging the other friction elements. This action causes clutch 136 to driveably connect between sprocket 36 and brake 134. In this instance, sun gear 114 is driven through the torque converter, ring gear 116 is held against rotation in the forward drive direction through clutch 136 and brake 134, and the output is taken at carrier 120 and output shaft 14. However, during a coast condition, i.e., when the drive wheels of the vehicle are driving the output shaft, clutch 136 overruns, and ring gear 116 is free to rotate. Therefore, there is no engine braking with the transmission operating in the low gear ratio in the drive range.

An upshift to the continuously variable ratio range occurs automatically by maintaining forward brake 134 engaged and by engaging clutch 102. This action causes clutch 136 to overrun. With the transmission controlled in this way, ring gear 116 is driven in response to the increasing speed of the output of drive mechanism 16 and the speed reduction of the first fixed ratio mechanism 18 and sun gear 114 is driven at the speed of input shaft 12. Throughout this range, the speed of carrier 120 preferably varies between 0.497 and 1.608 times the engine speed. During operation in the manually selected low gear range, the speed of carrier 120 preferably is 0.286 times engine speed.

Reverse drive results by engaging reverse brake 132 and disengaging all of the other hydraulically actuated friction brakes and clutches. With the transmission controlled in this way, carrier 126 is fixed against rotation on the transmission housing through brake 132, the sun gears 114, 122 are driven at the speed of input shaft 12, and the output of the second gear unit, ring gear 124, carrier 120 and output shaft 14, are underdriven in relation to the speed of input shaft 12 in the opposite direction to that of shaft 12.

FIG. 5 shows the state of the friction elements and overrunning coupling 136 required to produce each of the operating ranges of the transmission of FIG. 4. From FIG. 5 it can be seen that the changes between low gear and the variable ratio mode are nonsynchronous, i.e. they result by changing the state of only one hydraulically actuated friction element.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A continuously variable transmission comprising:

an input shaft;

an output shaft;

a variable ratio drive having an input driveably connected to the input shaft and an output, for producing a continuously variable ratio of the rotational speed of the input shaft to the rotational speed of said output;

a fixed ratio drive having an input driveably connected to the output of the continuously variable ratio drive, and having an output;

a planetary gearset including a sun gear driveably connected to the input shaft, a first ring gear surrounding the sun gear and driveably connected to the output of the fixed ratio drive, a first set of planet pinions in continuous meshing engagement with the sun gear and first ring gear, and a carrier rotatably supporting the first planet pinion set and driveably connected to the output shaft;

a transfer clutch for alternately driveably connecting and disconnecting the output of the variable ratio drive and input of the fixed ratio drive;

a low brake for alternately releasing and holding the first ring gear against rotation;

a forward brake located in a torque reaction path between the first ring gear and a rotatably fixed member for alternately releasing and holding the first ring gear against rotation on said rotatable fixed member; and an overrunning clutch located in said torque reaction path in series with said forward brake between said forward brake and first ring gear, for producing a one-way drive connection of the forward brake and ring gear.

2. The transmission of claim 1 further comprising:

a second planetary gearset including a second sun gear driveably connected to the input shaft, a second ring gear surrounding the second sun gear and driveably connected to the carrier and output shaft, a second carrier, and a second set of planet pinions rotatably supported on the second carrier in continuous meshing engagement with the second sun gear and second ring gear; and a reverse brake for alternately releasing and holding the second carrier against rotation.

3. The transmission of claim 1 further comprising:

a second fixed ratio drive having an input driveably connected to the carrier and output shaft, and having an output;

a first axle shaft driveably connected to the output shaft;

a second axle shaft;

a second clutch for alternately driveably connecting and disconnecting the output of the second fixed ratio drive and the second axle shaft.

4. The transmission of claim 3, wherein the second fixed ratio drive includes an input sprocket wheel, an output sprocket wheel, and a flexible continuous element driveably engaging the input sprocket wheel and output sprocket wheel.

5. The transmission of claim 1 further comprising:

a torque converter having an impeller adapted for a driveable connection to a power source, a turbine adapted for a hydrokinetic drive connection to the impeller and driveably connected to the input shaft.

6. The transmission of claim 1, wherein the fixed ratio drive includes an input sprocket wheel, an output sprocket wheel, and a flexible continuous element driveably engaging the input sprocket wheel and output sprocket wheel; and the variable ratio drive includes an input sheave, an output sheave, and a flexible continuous element driveably engaging the input sheave and output sheave at steplessly variable radial positions.

7. A continuously variable transmission comprising:

an input shaft;

an output shaft;

a variable ratio drive having an input driveably connected to the input shaft and an output, for producing a continuously variable ratio of the rotational speed of the input shaft to the rotational speed of said output;

a fixed ratio drive having an input driveably connected to the output of the continuously variable ratio drive, and having an output;

a planetary gearset including a sun gear driveably connected to the input shaft, a first ring gear surrounding the sun gear and driveably connected to the output of the fixed ratio drive, a first set of planet pinions in continuous meshing engagement with the sun gear and first ring gear, and a carrier rotatably supporting the first planet pinion set and driveably connected to the output shaft;

a transfer clutch for alternately driveably connecting and disconnecting the output of the variable ratio drive and input of the fixed ratio drive; and a low brake for alternately releasing and holding the first ring gear against rotation;

a second planetary gearset including a second sun gear driveably connected to the input shaft, a second ring gear surrounding the second sun gear and driveably connected to the carrier and output shaft, a second carrier, and a second set of planet pinions rotatably supported on the second carrier in continuous meshing engagement with the second sun gear and second ring gear;

a reverse brake for alternately releasing and holding the second carrier against rotation;

a forward brake located in a torque reaction path between the first ring gear and a rotatably fixed member for alternately releasing and holding the first ring gear against rotation on said rotatably fixed member; and an overrunning clutch located in said torque reaction path in series with said forward brake between said forward brake and first ring gear, for producing a one-way drive connection of the forward brake and first ring gear.

8. The transmission of claim 7 further comprising:

a second fixed ratio drive having an input driveably connected to the carrier and output shaft, and having an output;

a first axle shaft driveably connected to the output shaft;

a second axle shaft;

a second clutch for alternately driveably connecting and disconnecting the output of the second fixed ratio drive and the second axle shaft.

9. The transmission of claim 7 further comprising:

a torque converter having an impeller adapted for a driveable connection to a power source, a turbine adapted for a hydrokinetic drive connection to the impeller and driveably connected to the input shaft.

10. The transmission of claim 7, wherein the fixed ratio drive includes an input sprocket wheel, an output sprocket wheel, and a flexible continuous element driveably engaging the input sprocket wheel and output sprocket wheel; and the variable ratio drive includes an input sheave, an output sheave, and a flexible continuous element driveably engaging the input sheave and output sheave at steplessly variable radial positions.

11. The transmission of claim 10, wherein the second fixed ratio drive includes an input sprocket wheel, an output sprocket wheel, and a flexible continuous element driveably engaging the input sprocket wheel and output sprocket wheel.

* * * * *